United States Patent [19]

Hawkins

[11] Patent Number: 5,624,563
[45] Date of Patent: Apr. 29, 1997

[54] PROCESS AND APPARATUS FOR AN ACTIVATED SLUDGE TREATMENT OF WASTEWATER

[76] Inventor: John C. Hawkins, P.O. Box 566, Murrells Inlet, S.C. 29576

[21] Appl. No.: 519,423

[22] Filed: Aug. 25, 1995

[51] Int. Cl.$^6$ .................................................. C02F 3/12
[52] U.S. Cl. ................ 210/607; 210/624; 210/195.3; 210/253; 210/903
[58] Field of Search ........................... 210/605, 607, 210/621, 624, 626, 903, 195.1, 195.3, 202, 253, 258, 259

[56] References Cited

U.S. PATENT DOCUMENTS

| | | | |
|---|---|---|---|
| 3,468,795 | 9/1969 | Bye-Jorgensen et al. | 210/7 |
| 3,622,507 | 11/1971 | Pasveer | 210/6 |
| 3,964,998 | 6/1976 | Barnard | 210/7 |
| 4,243,522 | 1/1981 | Ter-Borch et al. | 210/774 |
| 4,376,275 | 3/1983 | Raper | 210/605 |
| 4,479,876 | 10/1984 | Fuchs | 210/605 |
| 4,537,682 | 8/1985 | Wong-Chong | 210/611 |
| 4,563,282 | 1/1986 | Wittmann et al. | 210/619 |
| 4,568,457 | 2/1986 | Sullivan | 210/151 |
| 4,604,206 | 8/1986 | Sullivan | 210/603 |
| 4,624,788 | 11/1986 | Repin | 210/624 |
| 4,663,044 | 5/1987 | Goronszy | 210/610 |
| 4,780,208 | 10/1988 | Bohnke et al. | 210/605 |
| 4,793,930 | 12/1988 | Soeder et al. | 210/614 |
| 4,867,883 | 9/1989 | Daigger et al. | 210/605 |
| 4,910,541 | 3/1990 | Wade et al. | 210/241 |
| 4,948,510 | 8/1990 | Todd et al. | 210/624 |
| 4,952,316 | 8/1990 | Cooley | 210/626 |
| 4,961,854 | 10/1990 | Wittmann et al. | 210/621 |
| 4,966,705 | 10/1990 | Jamieson et al. | 210/605 |
| 4,975,197 | 12/1990 | Wittmann et al. | 210/626 |
| 5,013,441 | 5/1991 | Goronszy | 210/605 |
| 5,061,368 | 10/1991 | Tada et al. | 210/151 |
| 5,137,636 | 8/1992 | Bundgaard | 210/605 |
| 5,160,043 | 11/1992 | Kos | 210/605 |
| 5,182,021 | 1/1993 | Spector | 210/605 |
| 5,185,079 | 2/1993 | Dague | 210/603 |
| 5,192,441 | 3/1993 | Sibony et al. | 210/603 |
| 5,192,442 | 3/1993 | Piccirillo et al. | 210/605 |
| 5,196,111 | 3/1993 | Nicol et al. | 210/96.1 |
| 5,205,936 | 4/1993 | Topnik | 210/614 |
| 5,211,847 | 5/1993 | Kanow | 210/610 |
| 5,213,681 | 5/1993 | Kos | 210/605 |
| 5,228,996 | 7/1993 | Lansdell | 210/605 |
| 5,234,595 | 8/1993 | DeGregorio et al. | 210/605 |
| 5,248,422 | 9/1993 | Neu | 210/605 |
| 5,252,214 | 10/1993 | Lorenz et al. | 210/605 |
| 5,266,200 | 11/1993 | Reid | 210/605 |
| 5,275,722 | 1/1994 | Beard | 210/195.1 |
| 5,288,407 | 2/1994 | Bodwell et al. | 210/617 |
| 5,326,459 | 7/1994 | Hlavach et al. | 210/150 |
| 5,342,522 | 8/1994 | Marsman et al. | 210/605 |
| 5,342,523 | 8/1994 | Kuwashima | 210/607 |
| 5,348,653 | 9/1994 | Rovel | 210/605 |
| 5,354,458 | 10/1994 | Wang et al. | 210/180 |
| 5,354,471 | 11/1994 | Timpany et al. | 210/607 |

OTHER PUBLICATIONS

EPA Manual for Nitrogen Control, pp. 272–274; Advanced Environmental Systems Leaflets.

*Primary Examiner*—Christopher Upton
*Attorney, Agent, or Firm*—Michael E. Mauney

[57] ABSTRACT

A process and apparatus for biological purification of wastewater resulting in reduction of biological oxygen demand, reduction of suspended solids, and for nitrification, wherein the process involves aerating wastewater in a treatment zone for reduction of biological oxygen demand, transferring the mixed liquor from this treatment zone on an alternate basis to a second or third treatment zone which undergoes an aeration/settle, fill and decant cycle. As the second or third zone is receiving influent, it is being decanted in a modified plug-flow fashion. The alternate treatment zones allow for a continuous discharge of treated effluent during the process. During aeration of the second or third treatment zone, mixed liquor is recycled to the first treatment zone. Sludge is retained long enough to achieve nitrification. This invention is particularly suited for modification of aerated lagoon systems to achieve nitrification with a high degree of efficiency.

18 Claims, 4 Drawing Sheets

PROCESS AND APPARATUS FOR AN ACTIVATED SLUDGE TREATMENT OF WASTEWATER

BACKGROUND AND SUMMARY OF INVENTION

I. Field of the Invention

This invention is related to methods, processes, and apparatus for treatment of municipal or industrial wastewater by an activated sludge system designed for effective reduction of biological oxygen demand, reduction of suspended solids, and for nitrification.

II. Description of Related Art

Wastewater is treated by a biological oxidation process. Wastewater is conventionally mixed with an activated sludge with the simultaneous introduction of oxygen in the form of the ambient air or of a gas having an oxygen concentration greater than that of the ambient air. Aerobic microorganisms which are ubiquitous in the environment are contained in the activated sludge. By use of the oxygen mixed with the wastewater, these aerobic organisms oxidize carbon compounds which are a substantial part of the organic pollutants of wastewater. These carbon compounds are decomposed or degraded by conversion by the bacteria into further bacterial substance with carbon dioxide and water as by-products. These aerobic carbon decomposing microorganisms require oxygen to sustain their metabolic function, as well as to grow and reproduce.

Ammonia is present in many wastewaters as a by product of the decomposition of proteins. Ammonia is toxic to many forms of aquatic life, hence its removal may be required to meet environmental standards. Autotrophic bacteria remove ammonia from wastewater. These autotrophic bacteria are Nitrosomonas and Nitrobacter. These organisms are known to oxidize ammonia to nitrate in an aerobic aqueous solution within a wide range of ammonia concentration levels in the aqueous solution. These autotrophic microorganisms are ubiquitous in the environment and readily develop within the sludge. The ammonia is oxidated to nitrite by the Nitrosomonas bacteria. The nitrite is oxidated to nitrate by the Nitrobacter bacteria. This process of degradation of ammonium to nitrite and then nitrate in aerobic solution is usually termed "nitrification".

The biological oxidation of carbon containing organic pollutants and the biological decomposition of ammonium into nitrate are compatible aerobic processes and may take place in the same activated sludge. However, the use of a single activated sludge for both processes presents practical problems because of the different growth rates of the carbon consuming bacteria and of the nitrifying bacteria. The aerobic carbon consuming bacteria quickly grow and reduce the carbon bearing organic pollutants much quicker than the very slow growing autotrophic nitrifying bacteria. Also, the carbon consuming bacteria can inhibit the growth of the nitrifying bacteria in the presence of a large amount of substrate. Unless there is some provision in the process for retaining the activated sludge long enough to allow the growth and maturing of the autotrophic nitrifying bacteria, then the process will not result in nitrification of the ammonia bearing wastewater. More specifically, if the activated sludge is discharged before these slow growing nitrifying bacteria have reached maturity in sufficient numbers, nitrification will not occur.

Many communities use an aerated lagoon system for reduction of the biological oxygen demand of carbon organic waste. These are simply ponds dug into the earth. Ordinarily, their walls are sloped at a three-to-one grade, that is for each unit of rise there are three units of run in the wall grade. These lagoons may be aerated by pumping air into the lagoons or by stirring the wastewater contained therein. These lagoons are usually used in areas where there is land available for their construction. They are inexpensive to build and constitute a relatively low technology approach to treatment of the biological oxygen demand. Aerated lagoons ordinarily do not provide sufficient sludge age to obtain nitrification to meet standards imposed by regulatory agencies. Unpredictable variables, such as heavy rain water run off or variations in daily flows of waste water, temperature variations, ph variations, and the like, all have impact on the ability of an aerated lagoon to achieve nitrification. Further, in most such lagoons the activated sludge retention time is too short for growth of nitrifying bacteria.

One such lagoon system is described in *Low Maintenance Mechanically Simple Wastewater Treatment*, by L. G Rich, McGraw Hill, 1977. There it is recommended that an aerated lagoon system can be designed as a four-cell system consisting of a first completely suspended cell followed in series by three partially suspended cells. In the first completely suspended cell, surface aerators are used to provide a power level of at least six (6) $W/m^3$. The partially suspended cells have a power demand of one (1) $W/m^3$. It is recommended that the aeration cells be designed as inverted truncated pyramids. The effluent pipes to all aeration cells are discharged just below the aerators. Effluent is withdrawn from the partially suspended cells at the surface without any baffling which helps avoid retention of algae that might be generated in the system. For most size combinations for a multi-cellular aerated lagoon, the hydraulic retention time ranges from 4.74 days to 8.79 days. In the warmer summer months, in systems with higher hydraulic retention time, some growth of the autotrophic nitrifying bacteria may be achieved hence, some degree of nitrification may be achieved in an unmodified multi-cellular aerated lagoon system. However, such nitrification is uncertain and highly dependent on temperature and load variation.

A variety of ways are known to increase activated sludge age for nitrification. One way of solving the problem of maintaining sufficient activated sludge age to insure proper concentration of the nitrifying bacteria is seen in U.S. Pat. No. 4,479,876, Fuchs, which uses a carrier material having large macropores which securely attach the bacteria within the macropores of the carrier materials, which are then retained in the nitrification reactor. Thus, the nitrifying bacteria will not be carried out of the reactor with the effluent or discharged from the system with excess sludge, thus insuring a continuous presence of nitrifying bacteria. Another way of building activated sludge age is through the use of a multi-stage treatment process in which a settled sludge is removed from one of the later stages of treatment and recycled to one of the earlier stages of treatment Examples of this method of building activated sludge age can be found in Barnard U.S. Pat. No. 3,964,998 and Lorenz et al U.S. Pat. No. 5,252,214. However, these conventional systems may require extra tanks of concrete or steel, extensive operator expertise, or result in a relatively low efficiency of nitrification.

Consequently, it would be an advance in the art to modify conventional aerated lagoon or stabilization pond technology, so as to achieve a high degree of nitrification, a high tolerance for variations in wastewater inflow, and while maintaining a steady outflow of treated wastewater. A steady outflow of treated wastewater reduces the impact of pollutants remaining in the discharge, including any remaining ammonium contaminants, and makes it easier to meet environmental standards which are ordinarily measured by assuming the peak outflow is maintained throughout a given period over which the environmental impact is determined. Consequently, the present invention is concerned with apparatus and processes for nitrification that are particularly suitable for modifying a multi-cell aerated lagoon to achieve nitrifying wastewater treatment where efficiency is resistent to variations in inflow, which maintains an equal outflow, and is economical to design, to implement and simple to operate. Accordingly, in this invention there is an initial treatment cell. If an existing multi-cell aerated lagoon is being modified in accordance with this invention, one of the treatment cells in the aerated lagoon may serve as the initial treatment cell in accordance with the present invention. Depending on the needs of the operator of the system, one of the cells of a multi-cell aerated lagoon could be modified by baffles or such similar construction, so that the initial treatment cell of the present invention could occupy only a portion of a cell in a multi-cell aerated lagoon system. In the present invention, this initial treatment cell is designed to receive the initial wastewater treatment flow for the beginning of the treatment process. If the initial treatment cell of this invention is placed in a conventional multi-cell aerated lagoon, then the conventional three-to-one run-to-rise wall ratio of the conventional aerated lagoon treatment cell may be utilized to achieve flow equalization. This feature can be utilized to achieve flow equalization because in an earthen basin treatment cell with a three-to-one run-to-rise wall ratio, a relatively small increase in fluid depth in the cell represents a relatively large volume of storage capacity. Thus, when the inflow into the initial treatment cell is higher than the steady rate outflow, the difference between the volume leaving the initial treatment cell as outflow and the volume entering the initial treatment cell is as inflow will be absorbed by the excess storage capacity provided by the three-to-one run-to-rise wall ratio. When the present invention is employed in a conventional multi-cell aerated lagoon system, one of these cells could be used as an alternate cell for holding overflow sewage which exceeds the capacity of the initial treatment cell. Either the entire earthen basin treatment cell could be used for this purpose, or a portion of it could be separated by baffles from the remaining portion, the baffled portion used as an overflow holding cell for the initial treatment cell. The initial treatment cell is aerated to begin the decomposition and the reduction of the carbon containing pollutants by the aerobic carbon consuming bacteria. This first cell also acts as an aerobic selector which helps prevent sludge bulking at low food to microorganism ratios. The use of this initial aerated cell also assures mixing and dilution of any toxic or inhibitory substances in the incoming wastewater.

The partially treated effluent of the initial treatment cell is transferred at a constant rate on an alternate basis to a second or third treatment cell. Because the initial treatment cell is continuously aerated, the subsequent nitrifying cells can operate at close to a steady state condition. The second and third treatment cells go through a fill/decant, aerate, and settle cycle. The second or the third treatment cell is always being decanted at the same time and at the same rate that the cell is being filled. The second and third treatment cells are not decanted while they are being aerated, but only after they are settled. This provides that the activated sludge is retained in the second and third treatment cells as long as may be necessary to build sufficient sludge age for nitrification, even though there is a constant outflow from either the second and third treatment cells equal to the inflow from the initial treatment cell. This allows the activated sludge in both the second and third treatment cells to build sufficient age for the growth of the slow growing autotrophic nitrifying bacteria. Thus, the effluent alternately decanted from the second and third treatment cells has been nitrified. This outflow may be pumped to a fourth treatment area, which may be used for final sealing of any solids (polishing) before the effluent is discharged from the wastewater treatment plant. Nitrification may be achieved in the second and third treatment cell even if the inflow and outflow are variable. The critical factor is sufficient time to allow growth of the nitrifying bacteria, which is best achieved at a steady state but can be achieved in variable or dynamic conditions. During aeration of the second or third treatment cell, mixed liquor, hence sludge, may be recycled from the second or third cell to the aerated treatment cell. The purpose of this sludge recycling is not to build sludge age, but to guard against declining nitrification efficiency in the second and third cells because of lack of food for the nitrifying bacteria. Also, sludge may be wasted from the first, second, and third cells used for nitrification. This allows the operator of the system to achieve optimal sludge age for greatest nitrification efficiencies.

When a conventional multi-cell aerated lagoon system is being modified for nitrification in accordance with the present invention, the partially treated effluent from the initial treatment cell is ordinarily transferred to a second earthen lagoon which has been modified into three separate compartments by baffles. The rate of transfer of the partially treated effluent is constant and usually at the same average rate that wastewater enters the plant for treatment. The partially treated effluent from the initial treatment cell is transferred to a first compartment which is continuously aerated. The first compartment is separated from a second and third compartment by baffles placed within the conventional earthen basin of a conventional multi-cell aerated lagoon wastewater treatment system. Partially treated effluent is transferred from the first treatment compartment alternately to either the second or third treatment compartment. Each of the second and third treatment compartments goes through a fill/decant, aerate, and settle cycle. Either of the second or third treatment compartments is always being decanted. The second and third treatment compartments are not decanted while they are being aerated, but only after they are settled. Thus, the settled sludge is retained in the second and third treatment compartments as long as may be necessary to build sufficient sludge age for nitrification. It is desirable that the sludge from the second and third side compartments be recycled to the first compartment. This can be achieved in a simple fashion by placing mechanical stirrers used for aeration of the second and third compartments close enough to the baffles separating the second and third compartments from the first compartment so that a portion of the mixed liquor produced by the mechanical stirrers is actually thrown over the baffle to the first treatment compartment. Mixed liquor, hence sludge, may also be recycled from the second and third compartments to the first compartment by other methods including pumps and channels dedicated to that purpose. While this promotes nitrification in the first treatment compartment, the primary purpose is to return autotrophic bacteria to areas of higher food concentration, thus preventing loss of autotrophic bacteria concentration in the second and third treatment compartment. The second and third treatment compartments are decanted only after they are settled. This provides that activated sludge is retained in the second and third treatment compartments as long as may be necessary to build sufficient activated sludge age for nitrification. This is achieved even though there is a constant outflow from the second and third treatment compartments equal to the inflow to the center treatment compartment. This alternating outflow from the second and third treatment compartments may be transferred to a third cell which is used for final settling of any solids (polishing) before the now nitrified effluent is discharged from the wastewater treatment plant. Sludge may be wasted from the first, second, or third compartments thus controlling sludge age in these compartments to increase nitrification efficiency. The wasted sludge is sent to another basin for further sludge treatment, if necessary, and for eventual disposal. Once the sludge pumped to this basin has settled, supernate from this basin may be returned to the system for treatment.

DETAILED DESCRIPTION OF DRAWINGS

Figure 1:
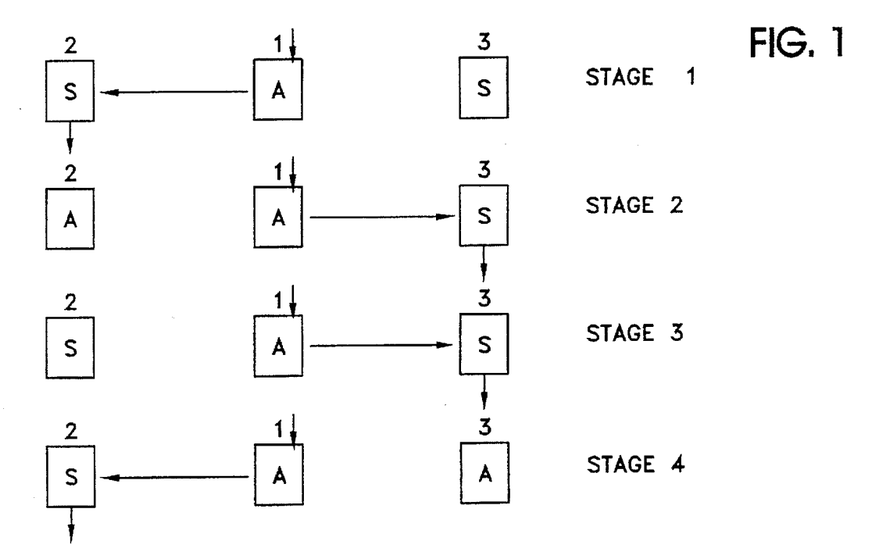
FIG. 1 is an illustration of the nitrification cycle that takes place in the present invention.

FIG. 1 shows the nitrification cycle of the present invention in a simple form. There are three (3) treatment zones one, two, and three (1, 2, and 3). There is a continuous inflow of influent to be nitrified into treatment zone one (1) indicated by the arrow pointing into zone one (1). There is also a continuous outflow of partially treated wastewater from treatment zone one (1) indicated by the arrow pointing out from treatment zone one (1) and alternately at treatment zones two (2) or three (3). There is also an outflow of nitrified effluent from either zone two (2) or zone three (3) depending on the stage in the treatment cycle as is indicated by the arrows. Zone one (1) is continuously aerated, indicated by the letter A in FIG. 1. Treatment zones two (2) and three (3) are either settling, indicated by the S in FIG. 1 or aerated, indicated by the letter A in FIG. 1.

In stage 1 of the nitrification treatment cycle, treatment zone three (3) is settling with no inflow and no outflow. Treatment zone two (2) is settling with both inflow and outflow, and treatment zone one (1) is being aerated with both inflow and outflow. The time required for this portion of the nitrification cycle can vary depending on the temperature, the nature of the wastewater being treated, the type of aeration equipment employed, the size and shape of the treatment zones, and by other variables.

In stage 2, treatment zone one (1) is still receiving inflow, still being aerated, and is still being simultaneously decanted. However, the outflow from treatment zone one (1) has been switched from treatment zone two (2) to treatment zone three (3) as is indicated by the arrows. Treatment zone three (3) is still being settled, but is now also being decanted. Treatment zone two (2) is neither receiving any inflow nor is giving up any outflow during this stage. However, it is being aerated. As with stage 1, the actual time required for this portion of the nitrification cycle can vary depending on a variety of variables.

In stage 3, treatment zone one (1) is still receiving inflow, is still being decanted, and is still being aerated. The outflow from treatment zone one (1) is still being transferred to treatment zone three (3) which is still undergoing a settling cycle. Treatment zone three (3) is also still being decanted of treated effluent. Treatment zone two (2) is now undergoing a settling cycle. During this settling cycle, it is neither being filled nor decanted.

In stage 4, treatment zone one (1) is still being filled and aerated. It is also being decanted, but the effluent flowing from treatment zone one (1) is now directed to treatment zone two (2) as is shown by the arrows. Treatment zone two (2) is now receiving effluent from treatment zone one (1) and is also being decanted of effluent. It is undergoing a settling cycle. Treatment zone three (3) is neither being decanted nor filled and is undergoing an aeration cycle. It is worth noting that the nitrified effluent is always decanted from either treatment zone two or three (2 and 3). When either treatment zone two or three (2 or 3) is being decanted, that zone is also being filled. The aeration cycle in treatment zones two or three (2 or 3) is followed by a settle cycle in which there is no fill or decantation. Each side treatment cell goes through an aerate/settle cycle and a fill/decant cycle. It is desirable to have a continuous, steady outflow thus one treatment cell is always undergoing a fill and decant cycle which requires that the aerate/settle cycle and the fill/decant cycle take the same amount of time. The length of the entire four stages of the nitrification treatment cycle for each cell (the aerate/settle cycle and the fill/decant cycle) can vary depending on the need of the particular waste water facility. It is desirable to aerate as long as possible in the aerate/settle cycle. The length of the aeration portion of the aeration/settle cycle is limited by the requirement that the sludge have sufficient time to settle so that fully settled effluent is decanted. The settling time required by sludge is determined by its settling characteristics, which is roughly dependent on the sludge concentration in the mixed liquor. It has been found in practice that the time required to settle the sludge in the aerate/settle cycle cart be as little as twenty minutes. It has also been found in practice that approximately three hours each is an appropriate time length for the aerate/settle and the fill/decant cycle, hence it takes approximately six hours for the full nitrification treatment cycle to be completed. The nitrification cycle of this invention can achieve a high degree of nitrification and is particularly adapted for use in a multi-cell earthen lagoon wastewater treatment facility.

Figure 2:
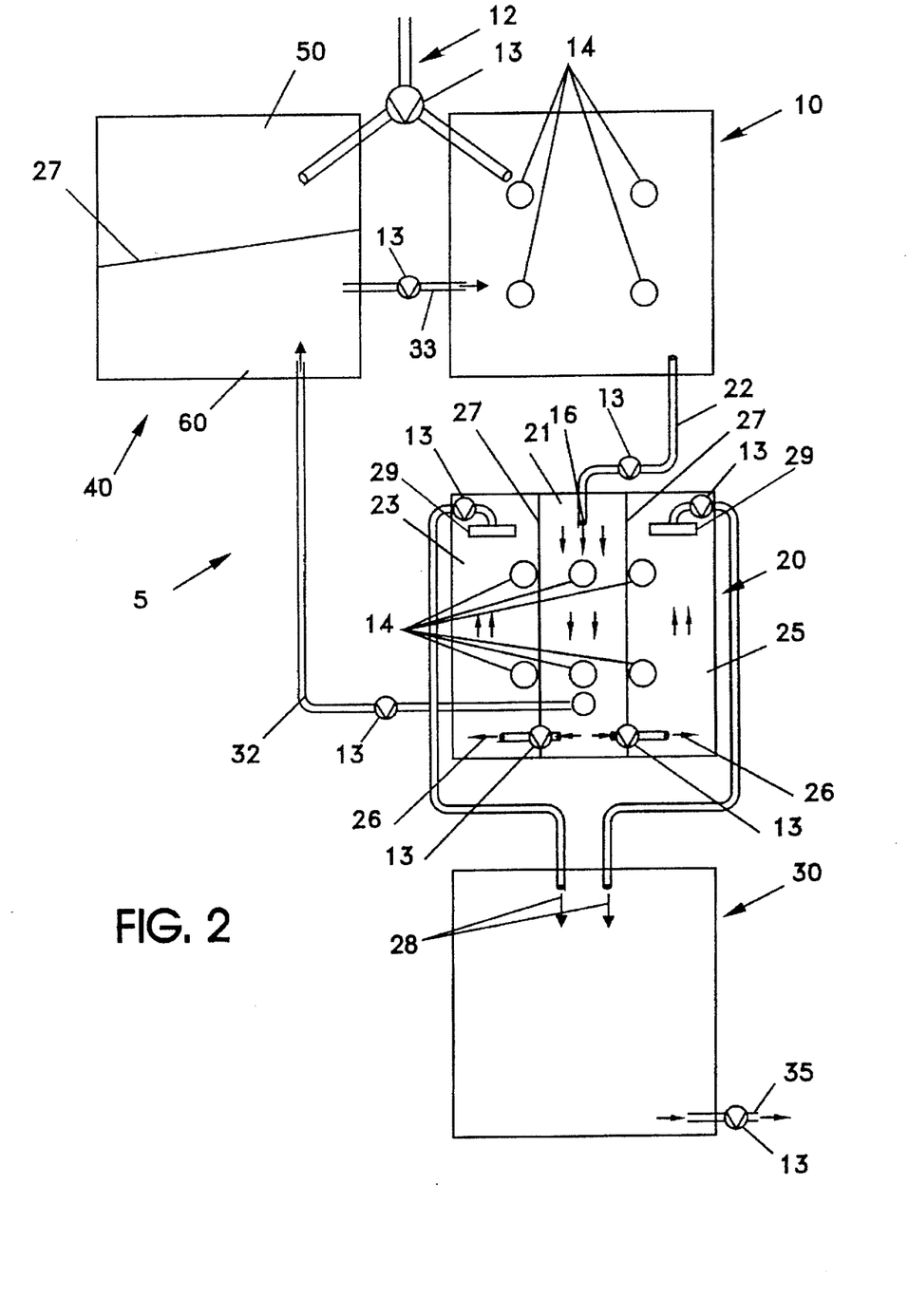
FIG. 2 illustrates a multi-cell aerated lagoon modified in accordance for carrying out the process of the present invention.
Figure 3:
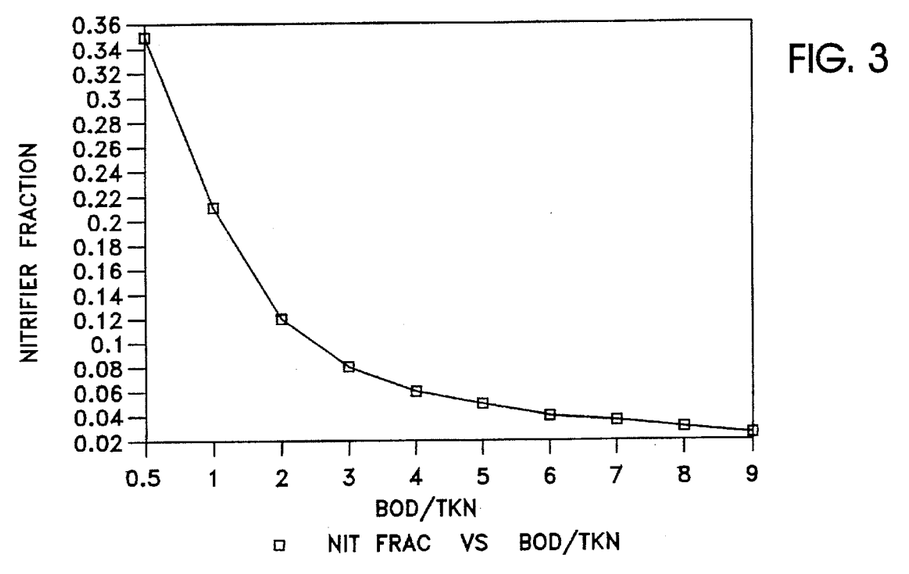
FIG. 3 is a graph illustrating the relationship of BOD and TKN.

Shown in FIG. 2 is a multi-cell aerated lagoon wastewater treatment plant (5) modified in accordance with the present invention to achieve a high degree of nitrification. One common design for a multi-cell aerated lagoon treatment plant requires four treatment cells (see *Low Maintenance Mechanical Wastewater Treatment*, by L. G. Rich, McGraw Hill, 1977). Such a four cell aerated lagoon system is being used in accordance with this invention. One cell may be adapted to serve as cell 1 (10) in accordance with this invention. Cell 1 (10) is the initial receiving basin for the inflow of wastewater by a pipe (12). Cell 1 is a completely stirred tank reactor providing an initial treatment for the influent soluble biological oxygen demand. The aerobic carbon consuming bacteria which are present in cell 1 (10) react with the influent soluble biological oxygen demand converting it to active mass, which is then transferred as mixed liquor into cell 2 (20) by a pipe (22). The use of a completely stirred reactor insures a thorough intermixing of the wastewater, activated sludge and oxygen. The carbon consuming microorganisms present and synthesized in the activated sludge in cell 1 (10) substantially decompose or degrade the organic carbon compounds so that the wastewater transferred from cell 1 (10) to cell 2 (20) carries only a weak biological oxygen demand. Before the effluent is introduced into the second and third settling basins (23, 25) of cell 2 (20), it is a desirable goal to reduce the biological oxygen demand, because this improves the nitrification process in the second and third sealing basins (23, 25) in cell 2 (20). The relationship between biological oxygen demand (BOD) and total Kjeldahl nitrogen (TKN) is shown in FIG. 3. As is seen in FIG. 3, when the ration of BOD to TKN is high the nitrifier fraction drops. Further, cell 1 (10) acts as an aerobic selector to help prevent formation of filamentous organisms which can cause sludge bulking and acts to assure mixing and dilution of toxic or inhibitory substances in the incoming wastewater.

Cell 1 (10) also serves to provide flow equalization from cell 1 (10) to cell 2 (20). Multi-cell aerated lagoons are ordinarily designed with a three-to-one run to rise wall ratio. Ordinarily, there is an average daily flow of wastewater for treatment which is an important design parameter for the aerated lagoons. Inflow into the lagoons is not steady, but reflects diurnal variations due to increased use of water resources at various times during the day by the subscribers to the system. A relatively small free board height in cell 1 (10) provides a relatively large increase in storage capacity as cell 1 (10) approaches full volume. The outflow (16) from cell 1 (10) is controlled at a constant rate, ordinarily at the average daily flow rate into the system. Another cell in the 4-cell system can be adopted for use as a holding cell. In FIG. 2 the holding cell is a baffled (27) portion (50) of cell 4 (40). This baffled portion (50) of cell 4 (40) may serve as an overflow holding basin for cell 1 (10) in the event of exceptional inflow which exceeds the excess capacity of cell 1 (10). If necessary, the inflow into cell 1 (10) may be directed to the baffled portion (50) of cell 4 (40) by a valve (13) in the inflow pipe (12). This baffled portion (50) is simply a holding cell and no treatment takes place in this baffled portion (50). When the outflow from cell 1 (10) has reduced the volume in cell 1 (10) below capacity, then the overflow can be returned to cell 1 (10) from this baffled portion (50) for treatment. The steady rate of flow from cell 1 (10) to cell 2 (20) provides that the nitrification can take place under steady state conditions, and that the second and third settling basins (23, 25) can operate at a steady state. This increases the nitrification efficiency of the system.

Cell 2 (20) is sub-divided into three (3) basins (21, 23, 25) by baffles (27). The baffles (27) separate the first aeration basin (21) from the second and third settling basins (23, 25), and allow the second and third settling basins (23, 25) to operate independently of the first aeration basin (21).

Under appropriate conditions the advantages attributed to cell 1 (10) in the description above could be incorporated into the first aeration basin (21) of cell 2 (20). However, most aerated lagoons are constructed with three (3) or more cells in place. Therefore, the use of cell 1 (10) simplifies the modifications necessary for this process and reduces the demands placed on the first aeration basin (21) in cell 2 (20) without requiring any additional construction costs. The flows into cell 1 (10), cell 2 (20), cell 3 (30), and cell 4 (40) are controlled by the valves (13) which may be operator controlled or controlled by the programmable controllers available in the marketplace.

Figure 4:
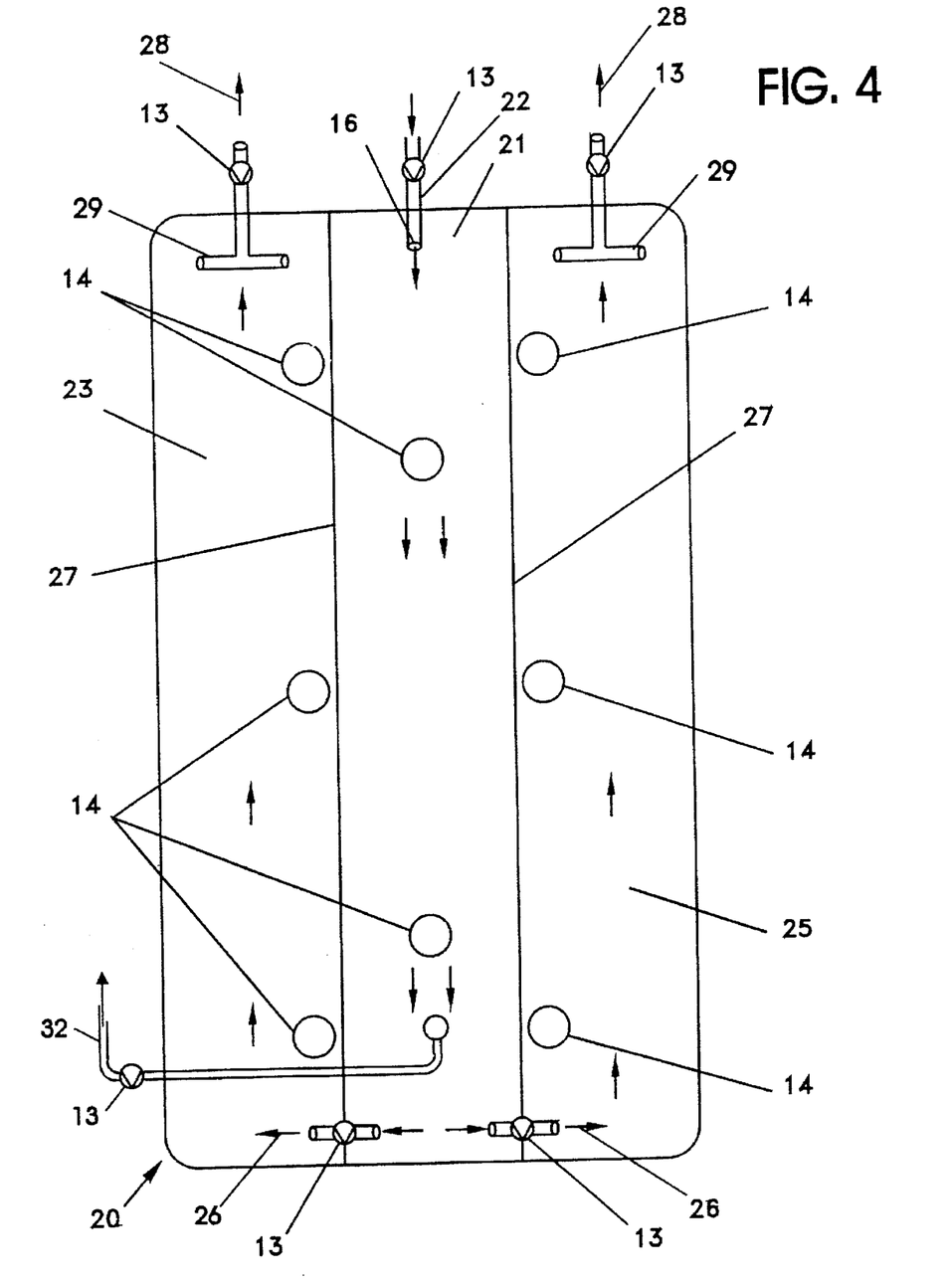
FIG. 4 shows the nitrification cell in detail in an aerated lagoon modified in accordance for carrying out the process of the present invention.

FIG. 4 shows in detail the cyclic operation of cell 2 (20) for nitrification treatment shown in FIG. 1. There is a continuous steady flow (16) from a pipe (22) into the first aeration basin (21) and a continuous outflow (26) at the same rate as the inflow, from the first aeration basin (21) alternately into the second or third settling basin (23) or (25). During this stage, the rate of inflow (16) into the first aeration basin (21) is equal, ordinarily, to the average daily rate of inflow (16) into the treatment plant. There is also an outflow (26) from the first aeration basin (21) into the second settling aeration basin (23) equal to the inflow (16) into the first aeration basin (21). The first aeration basin (21) is continuously aerated throughout the nitrification cycle by aerators (14). This second settling basin (23) is not being aerated (14) and is being decanted by decanters (29) of the treated wastewater, which had earlier been cycled into the second basin (23) and had undergone a full treatment cycle. Thus, the second basin (23) is simultaneously being filled with new wastewater to be treated while being decanted of the wastewater which had undergone a cycle of treatment. The second settling basin (23) is longer than it is wide. Because the inflow (26) from the first aeration basin (21) takes place at one end, the decanter (29) in the second settling basin (23) is placed at the opposite end. The volume of the second settling basin (23) is large enough that the inflow (26) at one end of the basin has relatively little impact on the overall condition of the basin while the basin is not being mixed. Thus, the inflow (26) and outflow (28) takes place in a modified plug-flow fashion so that there is no significant intermixing between the effluent flowing (26) from the first aeration basin (21) into the second settling basin (23) with the outflow (28) from the second settling basin (23) to cell 3 (30). The inflow and outflow is controlled by valves (13) which can be operator controlled or controlled by a programmable control unit available in the marketplace.

While the second settling basin (23) is being filled and decanted, the third settling basin (25) is undergoing a settling cycle, and the first aeration basin (21) is being simultaneously filled, decanted, and aerated. The amount of time necessary to accomplish stage 1 of the treatment cycle can vary depending on the size of the basins employed, the nature of the treated influent and its settling characteristics, the temperature, and other variables.

At the end of the stage 1, the inflow (26) from the first aeration basin (21) into the second settling basin (23) stops. Also, the outflow (28) from the second settling basin (23) to the third cell (30) also stops, and the second settling basin (23) begins its aeration cycle. The inflow (26) from the first aeration basin (21) now switches to third settling basin (25). The outflow (28) from third settling basin (25) to cell 3 (30) also begins at this point. Thus, while the second settling basin (23) is being aerated by the aerators (14), the third settling basin (25) is being filled and decanted simultaneously. In the third settling basin (25), new wastewater is added to undergo the nitrification cycle, while treated wastewater which has undergone the nitrification cycle is decanted to cell 3 (30). As in the second settling basin (23), the decanter (29) is placed at the opposite end of the third settling basin (25) from the end which receives the inflow (26), thus the fill/decant takes place in a modified plug-flow environment. The third settling basin (25) goes through a fill and decant cycle (stages 2 and 3). During this time period it is not undergoing any aeration. During this cycle, second settling basin (23) is not being decanted of the influent. The second settling basin (23) is undergoing a aeration cycle and a settling cycle. This is shown as stages 2 and 3 on FIG. 1. At stage 4, the inflow from the first basin (21) switches from the third settling basin (25) back to the second settling basin (23) which begins the fill/decant cycle. The outflow (28)

from the third settling basin (25) stops and it begins the aeration/settling cycle as earlier described.

Both the second and third settling basins (23) and (25) undergo a fill/decant, aerate/settle cycle. The fill operation consists of adding waste and substrate for the microbial activity. The fill activity takes place at one end of the basin. This is a static fill because there is no mixing or aeration taking place during the fill. However, there is a risk that the sludge in the second and third settling basins (23) and (25) can become exhausted of the nutrients required by the nitrifying bacteria. It is desirable to recycle some of the sludge and bacteria from the second and third settling basins (23) and (25) to the first aeration basin (21). If a conventional aerated lagoon is modified in accordance with the present invention so that the second and third settling basins (23) and (25) are separated from the first aeration basin (21) by baffles, it is possible to place one or more of the mechanical stirrers (14) used for aeration in proximity to the baffling (26) so that a portion of the mixed liquor, hence sludge, and autotrophic bacteria will be thrown across the baffle respectively separating the second and third settling basins (23) and (25) from the first aeration basin (21). For greatest efficiency, the rate of flow of mixed liquor to be recycled in this fashion should be equal to at least 5 times the average daily inflow into the first aeration basin (21) during the period of aeration of the second and third settling basins. It has been found in practice that this is a practical way of achieving the objective of sufficient sludge exchange between the second and third settling basins (23) and (25) and the first aeration basin (21) without the necessity of adding other equipment for this purpose. This adds significant economies to this nitrification process.

Simultaneously with the fill, the decant step is also taking place. Clarified effluent is decanted and passed on to the next stage in cell 3 (30). The decanting is ordinarily done by a floating weir decanter (29) placed at the opposite end of the basin from the point where the fill is taking place. Because the fill is a static fill, and because the rate of fill and decanting is low relative to the entire volume of the basin, the fill/decant cycle takes place in a modified plug-flow environment so that there is no intermixing between the waste and substrate being added to the basin and the nitrified effluent being decanted from the basin.

The second and third basins also undergo a reaction stage where there is aerobic mixing. This is followed by a settle stage, which allows the liquid and solid separation to occur. Because there is no inflow or decanting taking place during this settling stage, higher efficiencies can be demonstrated than in a continuous flow settler. Algae control is achieved in most circumstances by the continuous stirring by the aerators (14) in first aeration basin (21). The continuous stirring prevents sufficient sunlight from reaching the potential growth areas for algae in the first aeration basin (21). Likewise, the short cycle time (Six hours usually) in the second and third settling basins (23, 25), with at least two hours of the cycle devoted to aeration by stirring, is effective in preventing algae growth.

Subsequent to the settle stage, the fill/decant cycle begins again. It is anticipated that during period of low inflow there would be idle cycles in which one, or perhaps, both of the second and third basins would not be undergoing the fill/decant, aerate/settle cycle. During this idle cycle, excess sludge could be wasted from the second and third basins (23) and (25) to cell 3 (30) by decanting during aeration. However, sludge may be wasted directly from the first aeration basin (21) by a pipe (32) to a sludge treatment area (60) formed in the fourth cell (40) by a baffle (27) separating the overflow holding portion (50) from the sludge treatment area (60). Because mixed liquor, hence sludge, is recycled from the second and third settling basins (23, 25) to the first aeration basin (21), wasting sludge from the first aeration basin allows control of the sludge age in first aeration basin (21) and the second and third settling basins (23, 25). If the total volume wasted on a daily basis is equal to 1/30 of the average daily inflow into the first aeration basin (21), then the sludge will have approximately a 30-day age. The wasted sludge is settled in the sludge treatment area (60) and the supernate is returned to cell 1 (10) for treatment and ultimate discharge by a pipe (33).

The nitrified wastewater decanted from the second settling basin (23) and the third settling basin (25) is transferred to a third cell (30) which is used as a polishing pond for final settling of any remaining solids in the nitrified wastewater. Treated wastewater is discharged from cell 3 by a pipe (35). Flow to and from the various cells (10, 20, 30, 40) and the baffled portions of cells (50, 60, 21, 23, 25) are controlled by valves (13) which may be operated by human or electromechanical means. A number of programmable controllers are available in the marketplace for this purpose.

Figure 4A:
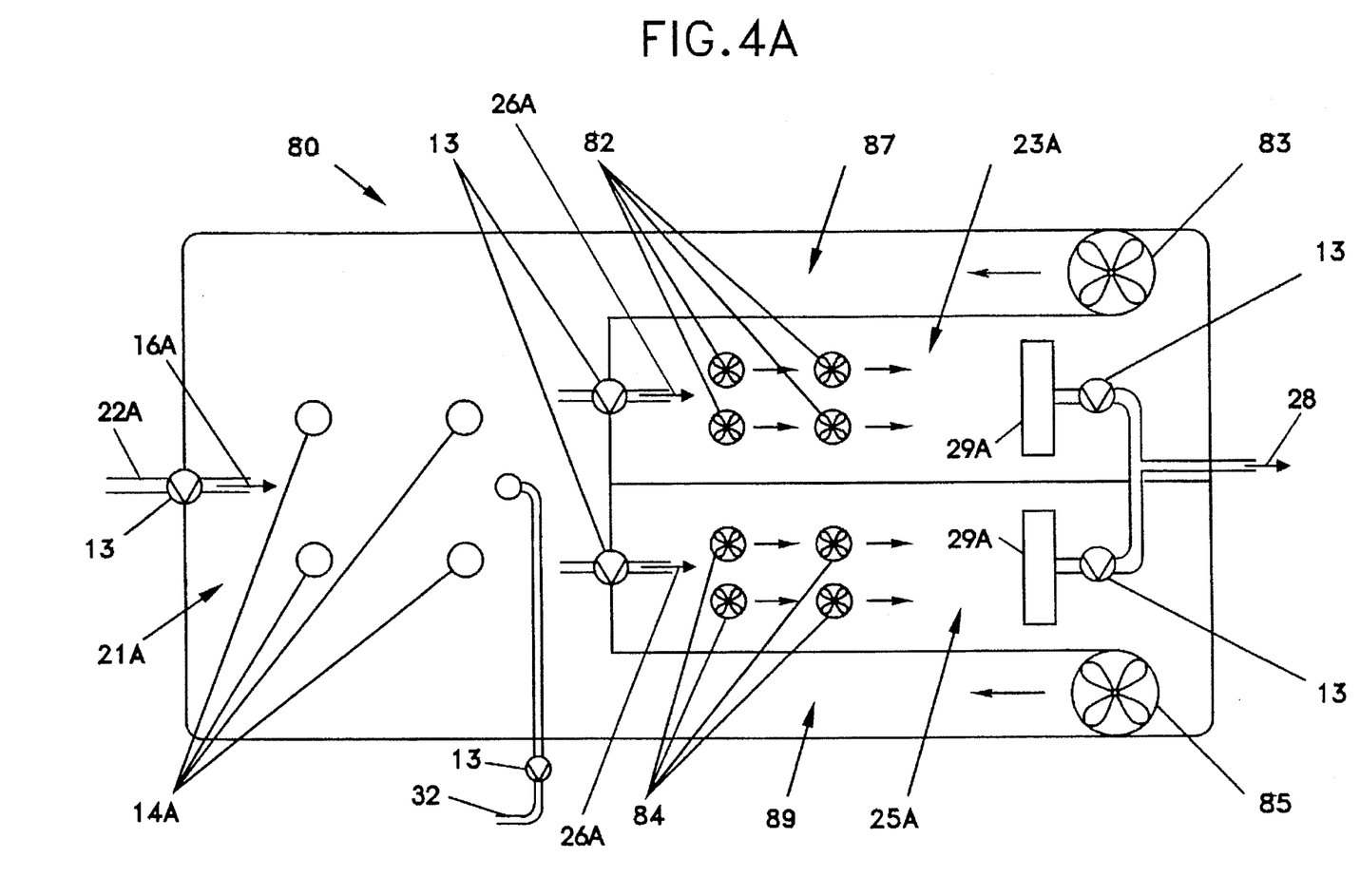
FIG. 4a shows in detail an alternate form for the nitrification cell in an aerated lagoon modified in accordance for carrying out the process of the present invention.

FIG. 4A shows an alternate configuration for the nitrification cell (80) in which the nitrification process takes place (cell 2 (20) in FIG. 4). In certain applications, the alternate construction choices shown in FIG. 4A may be preferable to those shown in FIG. 4. It will be appreciated by one of skill in the art that there are a wide variety of engineering choices available in choosing the precise equipment and construction to operate the process for nitrification of this invention which do not depart from the essentials of the invention.

More particularly, the nitrification cell (80) is split into a first aeration basin (21A) and a second and third settling basin (23A, 25A). Effluent is transferred to the first aeration basin (21A) from the initial treatment cell (10) by means of an inflow pipe (22A). The inflow (16A) of effluent into the first aeration basin (21A) is at the average daily rate of inflow into the plant sometimes referred to as "Q". The first aeration basin (21A) is continuously aerated by conventional aeration means (14A). Throughout all stages of the nitrification cycle as shown in FIG. 1 the first aeration basin (21A) is aerated. In the first stage of the nitrification cycle as shown in FIG. 1, the second settling basin (23A) is being filled (26A) at the same rate of flow (16A) into the first aeration basin (21A) and is being decanted by means of the decanter (29A) at a rate of decantation (28) equal to the inflow (26A). The third settling basin (25A) is settling without aeration and is not receiving inflow or being decanted.

In both the second and third settling basins (23A, 25A), there are propeller aeration mixers (82 or 84) oriented laterally so that the direction of flow generated by the propeller aeration mixers (82 or 84) is from the direction of the inflow (26A) from the first aeration basin (21A) toward the decanters (29A). These propeller aeration mixers (82 or 84) serve the dual purposes of aerating the second or third aeration basins (23A, 25A) during the nitrification cycle as shown in FIG. 1 and supporting a sludge recycle from the second or third settling basin (23A or 25A) to the first aeration basin (21A). These propeller aeration mixers (82 or 84) do not operate during the first stage of the nitrification cycle shown in FIG. 1.

During the second stage of the nitrification cycle, the first aeration basin (21A) is still being aerated. The second settling basin (23A) is being aerated by means of the propeller aeration mixers (82). At the end of the second settling basin (23A) furtherest from the first aeration basin (21A), there is a propeller pump (83) mounted so as to force a flow of mixed liquor, hence sludge, down the nitrification channel (87) and back to the first aeration basin (21A). Thus, the aeration of the second settling basin (23A) takes place with mixed liquor, hence sludge, exchange between the second settling basin (23A) and the first aeration basin (21A). The rate of this flow of mixed liquor being recycled should be approximately 5 times that of the average daily inflow (16A) into the first aeration basin (21A). During the second stage, the third settling basin (25A) is being filled (26A) and decanted (28) at the same rate as the average daily inflow (16A) into the first aeration basin (21A).

During the third stage the third settling basin (25A) is continuing to be filled and decanted at the rate equal to the average daily inflow (16A) into the first aeration basin (21A). However, the second settling basin (23A) is settling, hence is no longer being aerated by means of the propeller aerator mixers (82). There is no sludge recycling taking place from the second settling basin (23A) to the first aeration basin (21A) and the propeller pump (83) is not operating. The first aeration basin (21A) continues to be aerated and there is a continuous inflow (16A) into the first aeration basin (21A) at the rate of the average daily inflow (Q) into the sewage treatment plant.

In the fourth stage the filling (26A) and decantation (28) by decanter (29A) switches from the third settling basin (25A) to the second settling basin (23A). The second settling basin (23A) is being filled and decanted at the rate equal to the average inflow (16A) into the first aeration basin (21A). At this point, the third settling basin (25A) is being aerated by means of propeller aerator mixers (84). Mixed liquor, hence sludge, is being recycled by a propeller pump (85) which directs the mixed liquor down a recycling channel (89) to the first aeration basin (21A). As during the second stage of the nitrification cycle, the rate of mixed liquor recycle is approximately 5 times the rate of average daily inflow (16A) into the first aeration basin (21A). The first aeration basin (21A) is being aerated during this stage.

Ideally, during the aeration phase of either the third settling basin (25A) or the second settling basin (23A) there would be a complete mix of the contents of that basin with the contents of the first aeration basin (21A). The directional propeller aerators (82 & 84) along with propeller pumps (83 or 85) have found in practice to give a sufficient flow rate of recycle of sludge to be adequate to maintain appropriate nitrification efficiencies. If the flow rate of recycle promoted by the propeller aerators (82 or 84) and the propeller pumps (83 or 85) is equal to an approximate rate of 5 times the average daily flow (16A) into the first aeration basin (21A), then sufficient sludge recycle is achieved for the nitrifying bacteria to achieve high nitrification efficiencies. It is expected that in practice the amount of sludge recycle necessary may vary according to conditions. Likewise, the time required for settling, hence, the amount of time devoted to aeration and recycling of sludge can vary depending on the initial sludge conditions, temperature, sludge age, and other variables. The fill/decant cycle in the second settling basin (23A) and the third settling basin (25A) takes place in a modified plug-flow environment. Sludge is wasted from the first aeration basin (21A) by means of a pipe (32) to a sludge treatment area (60) as shown in FIG. 2. The mixed liquor recycle from the second and third settling basins (23A, 25A) assure that wasting sludge from the first aeration basin (21A) can control the sludge age for the entire nitrification cell (80). If the total volume wasted is 1/30 of the average daily inflow (16A) into the first aeration basin (21A), then the sludge will have an approximate 30-day age.

Sludge wasted from the alternate nitrification cell (80) is treated the same as sludge wasted from cell 2 (20).

Effluent decanted from the second and third settling basins (23A and 25A) is transferred to cell 3 (30) for final settling of any remaining solids before the treated wastewater is discharged from the plant by a pipe (35). The flows to, from, and within the nitrification cell (80) are controlled by valves (13) which may be operated by human or electro-mechanical means. Programmable controllers are available in the marketplace for this purpose.

I claim:

1. An aerated multi-zone activated sludge wastewater treatment apparatus comprising:

a. A first treatment zone for receipt of inflow of untreated wastewater, b. a second treatment zone for receipt of partially treated effluent from said first treatment zone, c. a third treatment zone for receipt of partially treated effluent from said first treatment zone, d. means for aeration for said first treatment zone, said second treatment zone, and said third treatment zone, e. a first means for transferring partially treated effluent from said first treatment zone to said second treatment zone, f. a second means for transferring partially treated effluent from said first treatment zone to said third treatment zone, g. a third means for transferring treated effluent from said second treatment zone and from said third treatment zone to a discharge point, h. means for controlling said first means for transferring partially treated effluent from said first treatment zone to said second treatment zone, for controlling said second means for transferring partially treated effluent from said first treatment zone to said third treatment zone, for controlling said means for aeration for said first treatment zone, said second treatment zone, and said third treatment zone, and for controlling said third means for transferring treated effluent from said second treatment zone and from said third treatment zone to a discharge point whereby reduction of biological oxygen demand, suspended solids, and nitrification of untreated wastewater is achieved, and i. means for timing in said means for controlling so that said first treatment zone is continuously aerated, said second treatment zone is filled and decanted for three time units, aerated and settled for three time units, and said third treatment zone is filled and decanted for three time units occurring simultaneously with aeration and settling of said second treatment zone, aerated and settled for three time units with aeration and settling of said third treatment zone occurring simultaneously with filling and decanting of said second treatment zone.

2. An aerated multi-zone activated sludge wastewater treatment apparatus as set forth in claim 1 further including means for recycling sludge from said second treatment zone and said third treatment zone to said first treatment zone.

3. An aerated multi-zone activated sludge wastewater treatment apparatus as set forth in claim 2 wherein said time unit is approximately one hour.

4. An aerated multi-zone activated sludge wastewater treatment apparatus as set forth in claim 3 wherein said second treatment zone and said third treatment zone are settled for at least 20 minutes following aeration.

5. An aerated multi-zone activated sludge wastewater treatment apparatus as set forth in claim 2 further including an initial aerated treatment zone for receipt of untreated wastewater and a fourth means for transferring mixed liquor from said initial aerated treatment zone to said first treatment zone.

6. An aerated multi-zone activated sludge wastewater treatment apparatus as set forth in claim 5 wherein said means for controlling includes a second means for controlling said first means for transfer, said second means for transfer, said third means for transfer, and said fourth means for transfer whereby a steady rate of flow is achieved.

7. A multi-cell aerated lagoon wastewater treatment apparatus modified for nitrification comprising:

a. a first aerated cell for receipt and initial treatment of wastewater;
   b. a second cell to receive and hold untreated wastewater when capacity of said first aerated cell is exceeded;
   c. a first means for transferring untreated wastewater between said second cell and said first aerated cell;
   d. a third cell divided into a first aerated treatment zone, a second treatment zone, and a third treatment zone;
   e. a second means for transferring partially treated effluent from said first aerated cell to said first aerated treatment zone in said third cell;
   f. a third means for transferring partially treated effluent from said first aerated treatment zone to said second treatment zone;
   g. a fourth means for transferring partially treated effluent from said first aerated treatment zone to said third zone;
   h. a first means for controlling said third means for transferring partially treated effluent from said first aerated treatment zone to said second treatment zone so that transfer of partially treated effluent from said first aerated treatment zone to said second treatment zone takes place in a modified plug-flow fashion displacing treated effluent from said second treatment zone to a point of discharge;
   i. a first means for aerating said second treatment zone;
   j. a first means for timing said first means for aerating said second treatment zone and said first means for controlling said third means for transferring partially treated effluent from said first aerated treatment zone to said second treatment zone, so that said second treatment zone is aerated and settled for three units of time, and filled/decanted by said third means for transferring partially treated effluent for three units of time;
   k. second means for controlling said fourth means for transferring partially treated effluent from said first aerated treatment zone to said third treatment zone so that transfer of partially treated effluent from said first aerated treatment zone to said third treatment zone takes place in a modified plug-flow fashion displacing treated effluent from said third treatment zone to a point of discharge;
   l. a second means for aerating said third treatment zone;
   m. a second means for timing said second means for aerating said third treatment zone and said second means for controlling said fourth means for transferring partially treated effluent from said first aerated treatment zone to said third treatment zone so that said third treatment zone is aerated and settled for three units of time, and filled/decanted by said fourth means for transferring partially treated effluent for three units of time.

8. A multi-cell aerated lagoon wastewater treatment apparatus modified for nitrification as set forth in claim 7 further including means for recycling sludge from said second treatment zone and said third treatment zone to said first aerated treatment zone.

9. A multi-cell aerated lagoon wastewater treatment apparatus modified for nitrification as set forth in claim 8 further including a third means for controlling said first means for controlling and said second means for controlling so that transfer from said first aerated treatment zone to said second treatment zone and transfer from said first aerated treatment zone to said third treatment zone is at a steady rate of flow.

10. A multi-cell aerated lagoon wastewater treatment apparatus modified for nitrification as set forth in claim 9 wherein said means for recycling sludge is accomplished by placing mixing aerators in said second treatment zone and in said third treatment zone in proximity to said first aerated treatment zone whereby a portion of a mixed liquor produced during operation of said mixing aerators in said second treatment zone and said third treatment zone is thrown into said first aerated treatment zone.

11. A multi-cell aerated lagoon wastewater treatment apparatus modified for nitrification as set forth in claim 9 wherein said means for recycling sludge is accomplished by propeller pumps and channels in said second treatment zone and in said third treatment zone which propel mixed liquor during aeration of said second treatment zone and during aeration of said third treatment zone from said second treatment zone and said third treatment zone to said first aerated treatment zone.

12. A multi-cell aerated lagoon wastewater treatment apparatus modified for nitrification as set forth in claim 9 wherein said unit of time is approximately one hour.

13. A multi-cell aerated lagoon wastewater treatment apparatus modified for nitrification as set forth in claim 12 wherein said second treatment zone and said third treatment zone are settled for at least 20 minutes following aeration.

14. A process for wastewater purification treating biological oxygen demand, reducing suspended solids, and for nitrification utilizing an activated single sludge and at least three treatment zones comprising:

a. introducing wastewater into a first aerated treatment zone whereby a mixed liquor is produced in a first aerated treatment zone,
   b. transferring mixed liquor from the first aerated treatment zone to a subsequent second treatment zone for three units of time during which the second treatment zone is in a settled state, said transfer of mixed liquor from the first aerated treatment zone to the second treatment zone takes place in a plug/flow mode while a like volume of clarified liquor is decanted from the second treatment zone to a point of discharge,
   c. stopping said transfer of mixed liquor from the first aerated treatment zone to the second treatment zone for three units of time,
   d. aerating and settling said second treatment zone for three units of time during said stoppage of transfer of mixed liquor from the first treatment zone into the second treatment zone for three units of time,
   e. aerating and setting a third treatment zone for three units of time during said transfer of mixed liquor from the first treatment zone to the second treatment zone for three units of time,
   f. transferring mixed liquor from the first aerated treatment zone to a said third treatment zone for three units of time during which the third treatment zone is in a settled state, said transfer from the first aerated treatment zone to the subsequent third treatment zone taking place during said stoppage of said transfer of mixed liquor from the first aerated treatment zone to the second treatment zone, said transfer of mixed liquor from the first aerated treatment zone to the third treatment zone taking place in a plug/flow mode while a like volume of clarified liquor is decanted from the third treatment zone to a point of discharge, g. repeating steps a through f.

15. A process for wastewater purification reducing biological oxygen demand, reducing suspended solids, and for nitrification utilizing an activated single sludge and at least three treatment zones as set forth in claim 14 including recycling mixed liquor from the second treatment zone during said aeration of the second treatment zone into the first aerated treatment zone and recycling mixed liquor from the third treatment zone to the first aerated treatment zone during said aeration of the third treatment zone.

16. A process for wastewater purification reducing biological oxygen demand, reducing suspended solids, and for nitrification utilizing an activated single sludge and at least three treatment zones as set forth in claim 15, including introducing wastewater into an initial fourth aerated treatment zone whereby a mixed liquor is produced in the initial fourth aerated treatment zone and transferring mixed liquor from the initial fourth aerated treatment zone into said first aerated treatment zone at a steady rate of transfer.

17. A process for wastewater purification reducing biological oxygen demand, reducing suspended solids, and for nitrification utilizing an activated single sludge and at least three treatment zones as set forth in claim 16 where said transfer of mixed liquor from the first aerated treatment zone to a second treatment zone and said transfer of mixed liquor from the first aerated treatment zone to a third treatment zone is at a steady rate of transfer equal to the steady rate of transfer from the initial fourth aerated treatment zone into the first aerated treatment zone.

18. A process for wastewater purification reducing biological oxygen demand, reducing suspended solids, and for nitrification utilizing an activated single sludge and at least three treatment zones as set forth in claim 17 where the unit of time is approximately one hour.

* * * * *